June 25, 1940.   H. VAN TONGEREN   2,205,966
DUST COLLECTING PLANT
Filed Nov. 5, 1938   2 Sheets-Sheet 1

INVENTOR
HERMANNUS VAN TONGEREN
By Walhausfed & Groff
attys

Patented June 25, 1940

2,205,966

UNITED STATES PATENT OFFICE 2,205,966

DUST COLLECTING PLANT

Hermannus van Tongeren, Heemstede, Netherlands

Application November 5, 1938, Serial No. 239,097
In Germany January 13, 1938

2 Claims. (Cl. 183—34)

My present invention relates to a dust collecting plan comprising a plurality of cyclone separators, and its principal object is an arrangement allowing a great number of cyclone separators to be accommodated in a relatively very restricted space.

Another object of my invention is a plant in which the dust separated by the several cyclone separators can be very easily collected and discharged.

With these and other objects in view, my novel plant comprises a plurality of stories each comprising a plurality of rows of cyclone separators, the cyclone separators of each row having a common gas feed duct and a common gas discharge duct located substantially vertically above the feed duct, a dust discharge passage being arranged by the side of each of said ducts.

In order that my invention may be more readily understood, I shall now proceed to describe the same with reference to the annexed drawings, which illustrate a plant in accordance with my invention in various views thereof.

Figure 1:
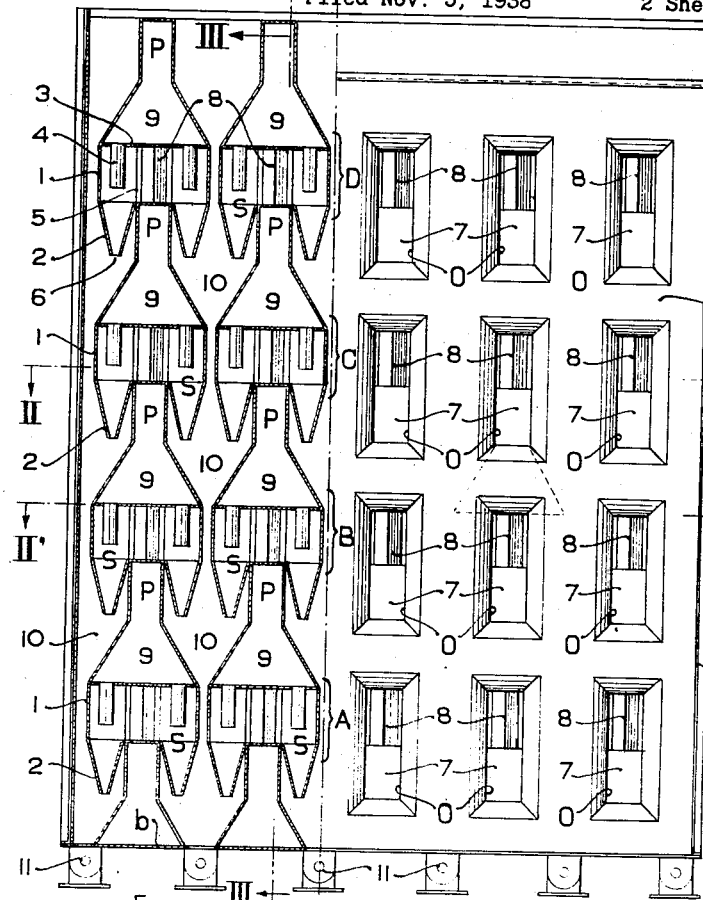
Figure 3:
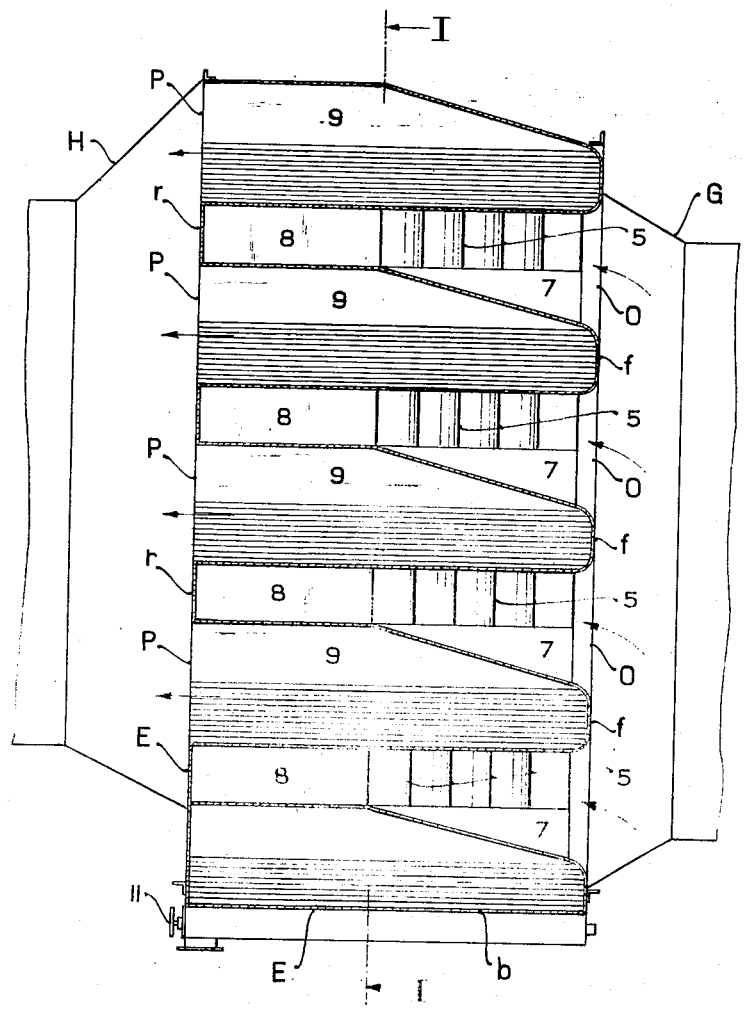

In Fig. 1, the right hand side part is a front view with the dust laden gas feed conduit broken away, and the left hand side part is a vertical section along the line I—I in Fig. 3.

Figure 2:
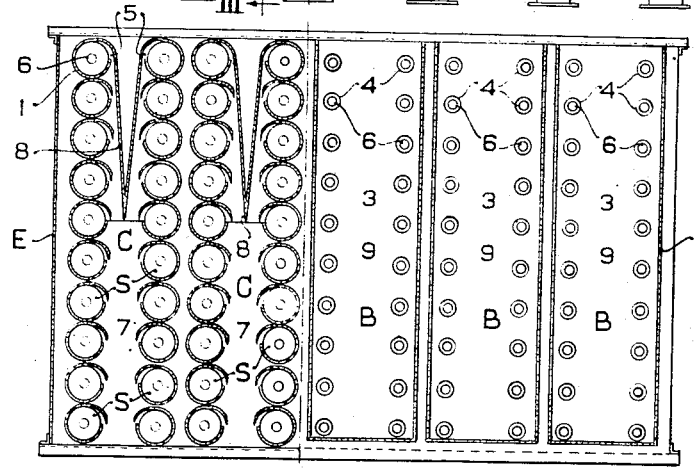

In Fig. 2, the left hand side part is a horizontal section along the line II—II, and the right hand side part is a horizontal section along the line II'—II' in Fig. 1, both the dust laden gas feed conduit and the cleaned gas discharge conduit being broken away.

Fig. 3 is a vertical sectional elevation along the line III—III in Fig. 1, showing both the dust laden gas feed conduit and the cleaned gas discharge conduit.

The plant as illustrated comprises a substantially parallelopipedic housing E having a front wall $f$ and a rear wall $r$. Said housing encloses a plurality of cyclone separators S, each comprising a casing composed of a cylindrical upper part 1, a conical lower part 2 and a cover 3. The cleaned gas discharge pipe 4 of each cyclone projects from the cover 3 downwardly into the casing 1 thereof. The dust laden gas is adapted to be fed into each cyclone through a vertical, substantially tangential slot 5, and the dust is adapted to be discharged from each cyclone by the lower opening 6 of the conical part 2 thereof.

The housing E comprises four stories A, B, C and D, each comprising five dust laden gas feed ducts 7, on either side of each of which is provided a row of ten cyclone separators S mounted side by side.

The dust laden gas is fed to several ducts 7 through a feed conduit G and through individual openings O in the front wall $f$ of the housing E. As will be seen from Fig. 3, the bottom wall of each duct 7 is upwardly inclined from the inlet openings O to a point about halfway between the front wall $f$ and the rear wall $r$. Extending from said point towards the rear wall $r$ are provided, in each duct 7, a deflector in the form of two diverging vertical walls 8, as shown in Fig. 2. It will thus be understood that the ducts 7 taper from the front wall $f$ to the rear wall $r$.

The cleaned gases escaping by the discharge pipes 4 of the several cyclones S disposed on either side of one duct 7 collect in a discharge duct 9, the bottom wall of which comprises the covers 3 of said cyclones, and the top wall of which is formed by the bottom wall of the next higher feed duct 7. Each cleaned gas discharge duct 9 communicates with an opening P in the rear wall $r$ of the housing E to discharge the cleaned gas into a common conduit H.

The side walls of the clean gas discharge ducts 9 are inclined and the dust discharge cones 2 open into the spaces thus left on either side of the ducts 9, so that the dust discharged by the cyclones of the several units falls through said space to the bottom $b$ of the housing E, whence it is adapted to be removed by screw conveyors 11.

Although the drawings illustrate a plant wherein each dust laden gas feed duct 7 feeds the cyclones of two rows mounted on either side thereof, it is evident that each duct 7 may be arranged to feed only one row of cyclones mounted on one side thereof.

From Fig. 1 it will be seen that a plant in accordance with my invention may be said to be composed of a plurality of "buildings" each having a plurality of "stories", each "story" of each "building" comprising at least one row of cyclones having a common dust laden gas feed duct and a common cleaned gas discharge duct provided substantially vertically above the feed duct, said "buildings" being separated by "thoroughfares" into which the dust collected by the several cyclones of the buildings is discharged.

It will be understood that it is not necessary for the "stories" of said "buildings" to form together a unitary structure, that is to say, to be directly and rigidly inter-connected. They may be vertically spaced apart and be associated with one another only through the walls of the housing E.

What I claim is:

1. A dust collector including a series of dust laden gas inlet ducts and cleaned gas discharge ducts alternately arranged in vertical superimposed relation, said inlet ducts being open at the front and closed at the rear and said discharge ducts being closed at the front and open at the rear, the tops of the inlet ducts and the bottoms of the discharge ducts being juxtaposed, a row of cyclones at each side of the inlet duct, each cyclone having a tangential side inlet communicating with the inlet duct and a cleaned gas outlet communicating with the superimposed discharge duct, and each cyclone also having a dust outlet discharging externally at the sides of the subjacent cleaned gas discharge duct, and a dust receptacle at the bottom of the collector common to superposed cyclones.

2. A dust collector comprising dust laden gas feed ducts and cleaned gas discharge ducts alternately arranged in vertical superimposed relation, said inlet ducts being open at the front and closed at the rear, and said discharge ducts being closed at the front and open at the rear and each gas discharge duct having inclined side walls, and the top of the inlet duct and bottom of the discharge duct being juxtaposed, a row of vertical cyclone separators at each side of each gas feed duct, said separators having their gas inlets opening from said feed duct and their cleaned gas outlets opening into the next higher discharge duct, and the dust outlet cones of the cyclone separators being disposed externally of said inclined side walls of the next lower cleaned gas outlet duct.

HERMANNUS VAN TONGEREN.